United States Patent [19]

Beucker

[11] 4,353,296

[45] Oct. 12, 1982

[54] USE OF ANISOTROPIC RUBBER FOR VENTA-NIP ROLLS

[75] Inventor: Albert W. Beucker, Factoryville, Pa.

[73] Assignee: Beloit Corporation, Beloit, Wis.

[21] Appl. No.: 246,659

[22] Filed: Mar. 23, 1981

[51] Int. Cl.³ .............................................. B30B 9/20
[52] U.S. Cl. .................................... 100/121; 100/176; 29/121.1; 29/121.6; 29/132; 162/358
[58] Field of Search ................. 100/121, 155, 90, 176; 29/121.1, 121.6, 130, 131, 132; 162/358, 368, 373

[56] References Cited

U.S. PATENT DOCUMENTS

| | | | |
|---|---|---|---|
| 3,198,694 | 8/1965 | Justus | 100/121 X |
| 3,266,976 | 8/1966 | Brezinski | 162/358 X |
| 3,599,306 | 8/1971 | Brafford | 29/132 |
| 3,852,862 | 12/1974 | Sukenik | 29/132 |

*Primary Examiner*—Peter Feldman
*Attorney, Agent, or Firm*—Dirk J. Veneman; Michael L. Gill; Gerald A. Mathews

[57] ABSTRACT

A roll having an elastomeric cover for engaging another roll to form a couple, said cover having circumferential grooves and comprising an anisotropic material which has a greater modulus of elasticity as measured in the transverse direction than in the circumferential direction to prevent closing of the grooves by transverse flow of rubber in the nip area.

9 Claims, 3 Drawing Figures

USE OF ANISOTROPIC RUBBER FOR VENTA-NIP ROLLS

BACKGROUND OF THE INVENTION

This invention relates to grooved elastomeric covered rolls and more particularly to a vented or grooved roll cover for use in the paper industry.

In the papermaking process, and for example in the press area of a papermaking machine, rolls having a resilient outer cover and circumferentially extending grooves are used in conjunction with another mating roll or other backing surface or means for pressing or squeezing a web of material such as paper. In this operation, it is important that the roll cover be resilient enough to avoid marking or damage to the web of paper or other material passing therebetween and to avoid damage to the roll cover in case small foreign bodies happen to pass between the rolls.

The roll cover, however, must also be capable of supporting large amounts of pressure in the nip in order to squeeze or press the web of material. The problem, however, becomes even more difficult since it is necessary that the circumferential grooves remain open in order to provide the proper venting action and to provide for the removal of water through the grooves.

The problem which frequently occurs involves the flattening or squeezing of the ribs as they pass through the nip area to such an extent that they widen out in directions transversely of the roll and effectively close up or restrict the grooves. Solutions in the past tended to involve either making the resilient material harder or the grooves wider. Each of these proposals, however, has its limitations since if the grooves become wider or the material harder, there is more tendency to mark or damage the material passing through the nip.

SUMMARY OF THE PRESENT INVENTION

In accordance with the present invention, the resiliency of the roll cover and the narrowness of the grooves can be maintained by providing a covering material which is anisotropic in its composite form. More specifically, the covering material has a modulus of elasticity which is substantially greater in the transverse direction than it is in the circumferential direction. Therefore, when a pressure is applied to the roll in the nip area, the rubber will flow or extend in circumferential directions rather than in transverse directions, which would widen the ribs and tend to close the grooves.

This anisotropic condition of the resilient covering material can be provided by calendering or stretching the elastomeric material in one direction in sheet form and then applying the unvulcanized or uncured material to the roll with the direction of stretching or calendering, extending transversely with respect to the roll. An alternate method of providing the anisotropic properties would be to provide, as a component of the rubber compound, reinforcing fibers, cords or other such material which are oriented primarily in the transverse direction with respect to the roll.

It is an object, therefore, of the present invention to provide an elastomeric grooved covering on a roll which is resilient yet capable of resisting closure of narrow grooves in the pressure nip area of the roll cover. Other objects will be in part apparent and in part pointed out in more detail hereinafter.

The invention accordingly consists in the features of construction, combination of elements and arrangement of parts which will be exemplified in the construction hereinafter set forth and the scope of the application which will be indicated in the appended claims.

IN THE DRAWING

DESCRIPTION OF THE PREFERRED EMBODIMENT

Figure 1:
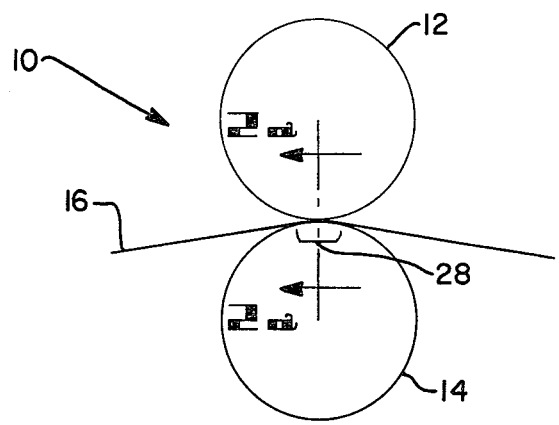
FIG. 1 is a side schematic view of a roll couple with a web of material passing therebetween.

With reference to the drawing, and in particular FIG. 1, there is illustrated a roll couple 10 comprising an upper roll 12 and a lower roll 14 with a web 16 passing therebetween. In a typical application, the web 16 may comprise a web of paper to be dewatered along with a felt material on either or both sides of the web of paper. One or both of the rolls 12 and 14 will include a resilient vented covering. The vented roll will include circumferential grooves for the removal of air and water from the web of material. Further, there will be a significant pressure applied between the two rolls 12 and 14 for the proper squeezing action on the web 16. This pressure can be as much as a thousand pounds per lineal inch (1,000 PLI or $1.78 \times 10^4$ KG/M) or more.

Figure 2A:
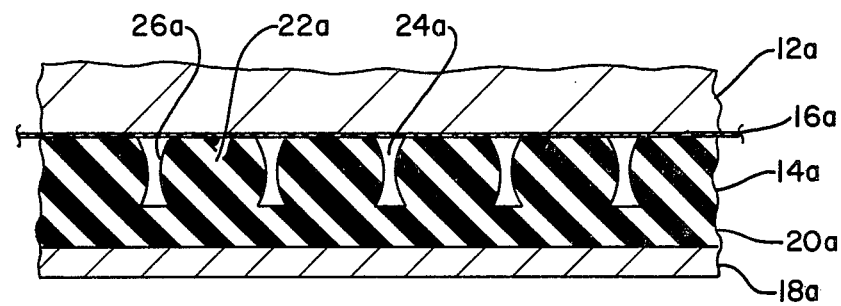
FIG. 2a is a greatly enlarged partial sectional view taken along lines 2—2 of FIG. 1 and illustrating the phenomenon which sometimes occurs in prior art structures.

Referring now to FIG. 2a, the enlarged partial sectional view illustrates the phenomenon occurring in prior art grooved rolls as they pass through the nip illustrated in FIG. 1. For purposes of clarity, corresponding parts illustrated in FIG. 2a will contain the suffix a. The upper roll 12a is illustrated as a solid surface roll, while the lower roll 14a is a roll containing a resilient grooved covering. A web 16a is shown passing between the rolls 12a and 14a.

The roll 14a comprises a metal core or base member 18a and a resilient outer cover portion 20a, which is adhered to and extends circumferentially about the core 18a. The resilient outer cover includes a plurality of ribs 22a alternating with a plurality of grooves 24a. The ribs 22a typically will be significantly wider than the grooves 24a and typically would be between 4 and 10 times as wide as the grooves 24a. Further, the grooves 24a will be as deep as or deeper than the width of the ribs 22a, generally on the order of one to two times the width of the ribs 22a. Typically the ribs will be from 0.10 to 0.25 inch (2.5 to 6.4 mm) wide and from 0.10 to 0.25 inch (2.5 to 6.4 mm) deep while the grooves generally will be from 0.02 to 0.06 inch (0.51 to 1.52 mm) wide.

It will be seen that under the extreme pressures or loading in the nip area of the roll cover the elastomeric material of the outer roll covering 20a will be compressed or required to flow in some direction. The tendency is for the elastomeric material to flow in the transverse direction in the nip area thus forming the bulges or bulbous portions 26a which tend to restrict or even close the grooves 24a. Needless to say, this restriction or closure of the grooves tends to reduce or altogether eliminate the effectiveness of the grooves in the nip area.

Figure 2B:
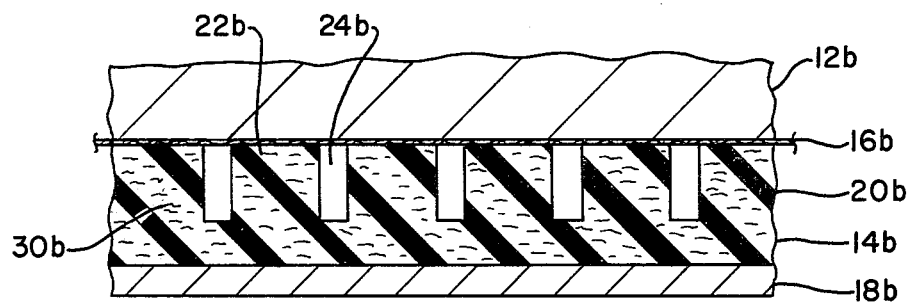
FIG. 2b is an enlarged partial sectional view taken along lines 2—2 of FIG. 1 and illustrating the present invention.

With reference to FIG. 2b, there is illustrated an enlarged view similar to that of FIG. 2a showing the configuration of the ribs and grooves of a roll cover made in accordance with the present invention as they pass through the nip area. For purposes of clarity, parts corresponding to parts in FIG. 1 will contain a suffix b in FIG. 2b. Again, there is included a solid or non-grooved roll 12b, a grooved roll 14b and a web of material 16b passing therebetween. The roll 14b includes a base member 18b which in the particular embodiment illustrated is steel and an elastomeric covering material 20b which extends circumferentially about the base member 18b and is adhered thereto. The outer surface portion of elastomeric material 20b includes a plurality of alternating ribs 22b and grooves 24b.

As noted above with respect to the embodiment of FIG. 2a, the ribs 22b typically will be significantly wider than the grooves 24b and would be between four and ten times as wide as the grooves 24b. Further, the grooves 24b will be as deep or deeper than the width of the ribs 22b, generally on the order of one to two times the width of the ribs 22b. The ribs will be from 0.10 to 0.25 inch (2.5 to 6.4 mm) wide and from 0.10 to 0.25 inch (2.5 to 6.4 mm) deep. The grooves generally will be 0.02 to 0.06 inch (0.51 to 1.52 mm) wide.

In accordance with the present invention, the elastomeric material 20b is provided with anisotropic properties such that the modulus of elasticity of the material is greater in the transverse direction than it is in the circumferential direction. For purposes of this invention, transverse directions shall be directions extending parallel to the rotational axis of the roll. The modulus of elasticity of the ribs in transverse directions should be at least 20% (twenty percent) greater than the modulus of elasticity in circumferential directions, and preferably at least 50% (fifty percent) greater. These anisotropic properties can be provided in any one of several of ways. Specifically, thin layers of unvulcanized rubber or other elastic material can be formed by an extrusion or calendering process whereby the molecular structure is oriented primarily in directions extending parallel to the direction of the extrusion or calendering, or in other words longitudinally with respect to the thin layer or web of material. These thin sheets of extruded or calendered unvulcanized rubber are stretched in the longitudinal direction and then sheared to lengths which approximate the width or transverse length of the roll. They are then wrapped about the roll with their longitudinal or calendered direction extending transversely of the roll. This will result in anisotropic properties in the roll cover which include a substantially higher modulus of elasticity in transverse directions as compared to circumferential directions.

Alternate methods of providing the higher modulus elasticity in the transverse direction include the provision of acicula, fiber or cords as a component of the elastomeric or rubber layers with the acicula, fibers or cords oriented in the transverse direction with little or no reinforcing material extending in circumferential directions.

Once the elastomeric material 20b has been formed on the roll and provided with the anisotropic properties of higher modulus elasticity in the transverse direction, the roll covering can be vulcanized in any suitable manner known to those skilled in the art. Following vulcanization the outer surface is machined to a perfectly cylindrical surface and the grooves 20b are carved in the surface in the usual way.

The elastomeric material along with any fiber, cord or acicular fillers is selected to provide a cover having a hardness with a nip equivalent to a 5 to 20 P & J cover. This nip equivalent hardness is the hardness measured in directions perpendicular to the roll cover surface.

It will be appreciated that although the roll couple illustrated includes one grooved roll 14b, and one solid surface roll 12b, it may be desirable in some instances to utilize two grooved rolls in the roll couple. It also may be desirable to use such a grooved roll 14b in conjunction with a backing shoe in an extended nip press such as illustrated in U.S. Pat. No. 4,229,253 for example.

While a certain representative embodiment and details have been shown for the purpose of illustrating the invention, it will be apparent to those skilled in the art that various changes and modifications may be made therein without departing from the spirit or scope of the invention.

What is claimed is:

1. A roll of the type used in conjunction with a backing means to form a nip through which a web passes, said roll comprising:

a resilient outer elastomeric cover having a plurality of alternating circumferentially extending ribs and grooves, said cover being characterized by having anistropic properties including a modulus of elasticity as measured in directions transverse to the rotational direction of the roll which is substantially greater than the modulus of elasticity measured in directions circumferentially of the roll.

2. The roll as claimed in claim 1 wherein said cover includes a molecular chain structure with the molecular chain oriented primarily in directions transverse with respect to the roll to thus provide the higher modulus of elasticity in said transverse directions.

3. The roll as claimed in claim 1 wherein said cover includes discreet fibers oriented substantially in the transverse directions with respect to said roll.

4. The roll as claimed in claim 1 wherein said cover includes a plurality of plies of cords extending transversely with respect to said roll.

5. The roll as claimed in any one of claims 1 through 4 wherein the grooves and ribs are substantially uniform in size across said roll and the depth of the grooves is equal to between one and two times the width of the ribs and the width of the grooves is no greater than 20% of the width of the ribs.

6. A roll as claimed in any one of claims 1 through 4 wherein said backing means is another roll.

7. A roll as claimed in any one of claims 1 through 4 wherein the modulus of elasticity as meausred in directions transvese to the rotational direction is at least 20% greater than as measured in circumferential directions.

8. A roll as claimed in any one of claims 1 through 4 wherein the modulus of elasticity as measured in directions transverse to the rotational direction is at least 50% greater than as measured in circumferential directions.

9. A roll as claimed in any one of claims 1 through 4 wherein the nip equivalent hardness is equal to between 5 and 20 P & J.

* * * * *